United States Patent
Yu et al.

(10) Patent No.: US 11,908,252 B2
(45) Date of Patent: Feb. 20, 2024

(54) APPARATUS AND METHOD FOR DETERMINING ERROR OF VEHICLE

(71) Applicants: Hyundai Motor Company, Seoul (KR); Kia Motors Corporation, Seoul (KR)

(72) Inventors: Min Sang Yu, Hwaseong-si (KR); Jin Su Jeong, Suwon-si (KR); Eun Young Choi, Seoul (KR); Ki Seok Seong, Cheonan-si (KR); Hyeong Jin Ham, Seongnam-si (KR); Rosali Sun Pyun, Seongnam-si (KR); Dong Il Yang, Seoul (KR); Woo Jin Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 555 days.

(21) Appl. No.: 16/846,603

(22) Filed: Apr. 13, 2020

(65) Prior Publication Data

US 2021/0174616 A1    Jun. 10, 2021

(30) Foreign Application Priority Data

Dec. 4, 2019  (KR) ........................ 10-2019-0160200

(51) Int. Cl.
*G07C 5/08*     (2006.01)
*G06N 3/08*     (2023.01)
*G07C 5/00*     (2006.01)

(52) U.S. Cl.
CPC ............. *G07C 5/0833* (2013.01); *G06N 3/08* (2013.01); *G07C 5/008* (2013.01); *G07C 5/0808* (2013.01)

(58) Field of Classification Search
None
See application file for complete search history.

(56) References Cited

U.S. PATENT DOCUMENTS

| | | | |
|---|---|---|---|
| 9,702,420 B2 | 7/2017 | Yoon | |
| 10,008,049 B2* | 6/2018 | Wang | ..................... F01M 11/10 |
| 10,223,842 B1 | 3/2019 | Lee et al. | |
| 10,286,923 B1* | 5/2019 | Hattab | .................. B60W 40/10 |
| 10,399,576 B2 | 9/2019 | Suzuki et al. | |
| 10,431,091 B2 | 10/2019 | Satoh | |

(Continued)

FOREIGN PATENT DOCUMENTS

| | | |
|---|---|---|
| CN | 2919381 Y | 7/2007 |
| CN | 105197012 A | 12/2015 |

(Continued)

OTHER PUBLICATIONS

Jianping, Y., "A Brief Discussion on How to Learn to Drive a Car Well," Science & Technology Information, Jan. 2009, 3 pages.

(Continued)

*Primary Examiner* — Abdhesh K Jha
(74) *Attorney, Agent, or Firm* — Slater Matsil, LLP (57) ABSTRACT

An apparatus for determining failure of a vehicle is provided. The apparatus includes a sensor configured to obtain autonomous driving information, and a controller configured to compare the autonomous driving information obtained during autonomous driving with a determination criterion set as failure sound information and to determine whether the failure occurs, based on the comparison result.

17 Claims, 6 Drawing Sheets

(56) References Cited

U.S. PATENT DOCUMENTS

| | | | |
|---|---|---|---|
| 11,351,989 B2 | 6/2022 | Yoo et al. | |
| 2007/0283695 A1* | 12/2007 | Figura | F02D 41/221 60/601 |
| 2016/0048811 A1* | 2/2016 | Asai | G07C 5/085 705/305 |
| 2017/0130786 A1 | 5/2017 | Yoon | |
| 2017/0162051 A1 | 6/2017 | Satoh | |
| 2018/0350167 A1 | 12/2018 | Ekkizogloy et al. | |
| 2019/0111943 A1 | 4/2019 | Suzuki et al. | |
| 2019/0315346 A1 | 10/2019 | Yoo et al. | |

FOREIGN PATENT DOCUMENTS

| | | |
|---|---|---|
| CN | 106463063 A | 2/2017 |
| CN | 106671983 A | 5/2017 |
| CN | 107458383 A | 12/2017 |
| CN | 109017810 A | 12/2018 |
| CN | 109649404 A | 4/2019 |
| CN | 110356419 A | 10/2019 |
| JP | 2005318721 A | 11/2005 |
| JP | 2008158670 A | 7/2008 |
| JP | 2011203116 A | 10/2011 |
| JP | 2019168840 A | 10/2019 |
| KR | 20130052930 A | 5/2013 |
| KR | 20140047983 A | 4/2014 |
| KR | 20190012954 A | 2/2019 |
| KR | 20190048061 A | 5/2019 |
| WO | WO-2020050761 A1 * | 3/2020 |

OTHER PUBLICATIONS

Ruoling, Z., et al., "Causes and Diagnostic Analysis of Automobile Mechanical Failures," Education Innovation, Jul. 2018, 3 pages.
The National Intellectual Property Administration, PRC, Notification of the First Office Action, dated Sep. 27, 2023, 17 pages.

* cited by examiner

APPARATUS AND METHOD FOR DETERMINING ERROR OF VEHICLE

CROSS-REFERENCE TO RELATED APPLICATIONS

This application claims priority to Korean Patent Application No. 10-2019-0160200, filed in the Korean Intellectual Property Office on Dec. 4, 2019, which application is hereby incorporated herein by reference.

TECHNICAL FIELD

The present disclosure relates to a vehicle failure determining apparatus and method.

BACKGROUND

Nowadays, with the interest in the safety of autonomous driving vehicles, a technology for accurately determining an autonomous driving possible state and an autonomous driving impossible state is being developed. When the autonomous driving vehicle determines that the current vehicle state is a state where autonomous driving is impossible, the autonomous driving vehicle may transfer the driving control right to a driver such that the autonomous driving is not performed.

In the meantime, because the responsibility of the accident depends on whether the subject of driving control is a driver or the vehicle when an autonomous driving vehicle has an accident, the vehicle failure determination for determining the driving control subject is very important. Accordingly, countries are likely to enact standards for determining the state that autonomous driving is impossible. Accordingly, there is a need to develop the technology for accurately determining vehicle failure.

SUMMARY

The present disclosure can solve problems occurring in the prior art while advantages achieved by the prior art are maintained intact.

An embodiment of the present disclosure provides a vehicle failure determining apparatus and method that may accurately determine the failure of a vehicle.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, an apparatus for determining failure of a vehicle includes a sensor obtaining autonomous driving information and a controller comparing the autonomous driving information obtained during autonomous driving with a determination criterion set as failure sound information and determining whether the failure occurs, based on the comparison result.

The controller collects learning autonomous driving information and performs learning based on the collected learning autonomous driving information to generate the failure sound information.

The controller transmits the learning autonomous driving information to a server and receives the learned failure sound information from the server.

The controller generates new failure sound information by performing learning based on collected autonomous driving information, when the autonomous driving information obtained in a section, in which the vehicle is repeatedly driving the predetermined number of times, is collected after the failure sound information is set as the determination criterion.

The controller transmits the collected autonomous driving information to a server and receives newly learned failure sound information from the server, when the autonomous driving information obtained in the section, in which the vehicle is repeatedly driving the predetermined number of times, is collected.

The controller updates the determination criterion based on the newly learned failure sound information.

The controller calculates a priority by respectively assigning weights to two or more precision diagnosis sections, when the two or more precision diagnosis sections are included in an autonomous driving section.

The controller increases reliability of a result determined in the precision diagnosis sections as the calculated priority is higher.

The controller sets the precision diagnosis sections based on road information and traffic information.

The controller sets at least one of a straight fixed-speed section, a straight deceleration section, a straight acceleration section, a rapid braking section, a rapid acceleration section, a steering section, a bump section, and/or a stop state as a precision diagnosis section.

The controller sets a road section within a predetermined distance based on a garage, as a precision diagnosis section in a case of a commercial vehicle.

The controller compares the determination criterion with autonomous driving information obtained while the commercial vehicle is driving in the precision diagnosis section at a point in time when the commercial vehicle leaves from the garage at a start of business and generates a primary determination result for determining whether the failure occurs, in the case of the commercial vehicle.

The controller compares the determination criterion with autonomous driving information obtained while the commercial vehicle is driving in the precision diagnosis section at a point in time when the commercial vehicle returns to the garage at an end of business and generates a secondary determination result for determining whether the failure occurs, in the case of the commercial vehicle.

The controller compares autonomous driving information obtained while the commercial vehicle is driving in the precision diagnosis section at a point in time when the commercial vehicle leaves from the garage at the start of business with autonomous driving information obtained while the commercial vehicle is driving in the precision diagnosis section at a point in time when the commercial vehicle returns to the garage at the end of business, and generates a tertiary determination result of determining whether the failure occurs, based on the comparison result, in the case of the commercial vehicle.

The controller finally determines whether the commercial vehicle fails, based on the primary determination result, the secondary determination result, and the tertiary determination result.

The controller compares the determination criterion with autonomous driving information obtained while the commercial vehicle is driving in the autonomous driving section at a point in time when the commercial vehicle leaves from a garage at a start of business and generates a primary determination result for determining whether the failure occurs, in the case of the commercial vehicle.

The controller compares the determination criterion with autonomous driving information obtained while the commercial vehicle is driving in the autonomous driving section at a point in time when the commercial vehicle returns to the garage at an end of business and generates a secondary determination result for determining whether the failure occurs, in the case of the commercial vehicle.

The controller compares autonomous driving information obtained while the commercial vehicle is driving in the autonomous driving section at a point in time when the commercial vehicle leaves from the garage at the start of business with autonomous driving information obtained while the commercial vehicle is driving in the autonomous driving section at a point in time when the commercial vehicle returns to the garage at the end of business, and generates a tertiary determination result of determining whether the failure occurs, based on the comparison result, in the case of the commercial vehicle.

The controller finally determines whether the commercial vehicle fails, based on the primary determination result, the secondary determination result, and the tertiary determination result.

According to an embodiment of the present disclosure, a method for determining failure of a vehicle includes obtaining autonomous driving information during autonomous driving, comparing the autonomous driving information with a determination criterion set as failure sound information, and determining whether the failure occurs, based on the comparison result.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
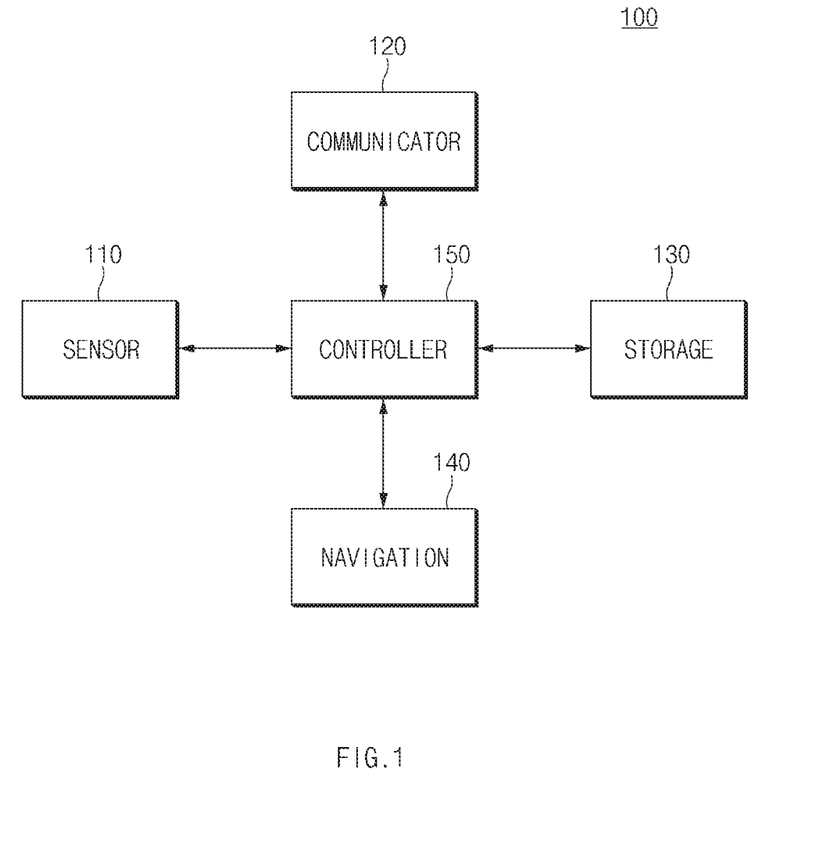
FIG. 1 is a block diagram illustrating a configuration of a vehicle failure determining apparatus, according to an embodiment of the present disclosure.

FIG. 1 is a block diagram illustrating a configuration of a vehicle failure determining apparatus, according to an embodiment of the present disclosure.

As illustrated in FIG. 1, a vehicle failure determining apparatus 100 of the present disclosure may include a sensor 110, a communicator 120, storage 130, navigation 140, and a controller 150.

The sensor 110 may obtain autonomous driving information. Specifically, the sensor 110 may obtain sound information generated during the autonomous driving of a vehicle. Herein, the sound information may include sound information of the driving device associated with the power train; for example, the sound information may include engine sound, tire sound, brake sound, steering sound, or the like; the sound information may include sound information generated during vehicle driving, in particular, during autonomous driving. The sensor 110 may obtain sound information as frequency data and waveform data. In addition, the sensor 110 may collect learning autonomous driving information. Here, the learning autonomous driving information may include the sound information of a driving device determined as failing. According to an embodiment, the learning autonomous driving information may include the sound information of a power train determined as failing.

The communicator 120 may transmit autonomous driving information and the learning autonomous driving information, which are obtained by the sensor 110, to a server. In addition, the communicator 120 may obtain the learned failure sound information or newly learned failure sound information from the server. To that end, the communicator 120 may communicate with the server (not illustrated) in various wireless communication schemes such as Wi-Fi, Wibro, Global System for Mobile (GSM) communication, Code Division Multiple Access (CDMA), Wideband Code Division Multiple Access (WCDMA), Universal Mobile Telecommunication System (UMTS), Time Division Multiple Access (TDMA), Long Term Evolution (LTE), and the like.

The storage 130 may store the learning autonomous driving information obtained by the sensor 110; the controller 150 may store the determination criterion learned based on the learning autonomous driving information obtained by the sensor 11o and the determination criterion newly learned based on the learning autonomous driving information obtained by the sensor 110. In addition, the storage 130 may store information of the precision diagnosis section.

In addition, the storage 130 may store at least one or more algorithms for performing calculation or execution of various commands for the operation of the vehicle failure determining apparatus according to an embodiment of the present disclosure. The storage 130 may include at least one storage medium of a flash memory, a hard disk, a memory card, a Read-Only Memory (ROM), a Random Access Memory (RAM), an Electrically Erasable Programmable Read Only Memory (EEPROM), a Programmable Read-Only Memory (PROM), a magnetic memory, a magnetic disk, and/or an optical disc.

The navigation 140 may provide information about a region, in which a vehicle is placed, in the form of a map, a text, or various symbols and may provide route information from one location (source) to another location (destination). To that end, the navigation 140 may receive the current location of the vehicle by including a GPS receiver and may provide map image information of a specific region, road information, traffic information, and the like based on the current location of the vehicle. The navigation 140 displays information about the road on which the vehicle is driving or a route to the destination that a driver wants to reach. The navigation 140 may include a display for displaying an autonomous driving start state, a microphone for receiving a driver's command, and a speaker for outputting sound. In recent years, the navigation 140 is likely to be implemented in the form of an AVN device in which an audio device, a video device and a navigation device are integrated.

The controller 150 may be implemented by various processing devices such as a microprocessor equipped with a semiconductor chip or the like capable of performing or executing various instructions. The controller 150 may control the overall operations of the vehicle failure determining apparatus according to an embodiment of the present disclosure. In particular, the controller 150 may compare the autonomous driving information, which is obtained during autonomous driving, with a determination criterion set as failure sound information, and may determine whether the failure occurs, based on the comparison result. To that end, the controller 150 may set and update the determination criterion. According to an embodiment, the controller 150 may collect autonomous driving information (learning autonomous driving information: for example>sound information of powertrain) obtained during autonomous driving and may classify the collected driving information depending on characteristics. Herein, the controller 150 may classify the collected learning autonomous driving information depending on a frequency form or waveform. Moreover, the controller 150 may convert (extract a specific vector) the classified driving information into a form easy for learning and may generate failure sound information by performing learning through deep learning based on the converted result. In addition, the controller 150 may set the learned failure sound information as the determination criterion.

According to another embodiment, the controller 150 may transmit the collected learning autonomous driving information to a server and may receive the learned failure sound information from the server. Furthermore, the controller 150 may set failure sound information received from the server, to the determination criterion.

Also, after the controller 150 sets failure sound information to the determination criterion, when the autonomous driving information obtained in the section, in which a vehicle is repeatedly driving the predetermined number of times, is collected, the controller 150 may generate new failure sound information by performing learning based on the collected autonomous driving information. Furthermore, the controller 150 may update the determination criterion based on the new failure sound information.

According to another embodiment, the controller 150 may transmit autonomous driving information obtained from a section, in which a vehicle is repeatedly driving the predetermined number of times, to the server and may receive newly learned failure sound information from the server. Moreover, the controller 150 may update the determination criterion based on the newly learned failure sound information received from the server.

The controller 150 may set the precision diagnosis section, may determine whether the precision diagnosis section is included in the autonomous driving section, and may calculate the priority by assigning a weight to the precision diagnosis section, thereby increasing the reliability of the results determined in the precision diagnosis section, as the calculated priority is higher. According to an embodiment, the controller 150 may set a precision diagnosis section based on the road information and traffic information, which are obtained from the navigation 140. For example, the controller 150 may set a road having a predetermined curvature or less as a precision diagnosis section and may set a region with a relatively low external noise or a section having a small traffic volume as a precision diagnosis section. According to an embodiment, the controller 150 may set at least one of a straight fixed-speed section, a straight deceleration section, a straight acceleration section, a rapid braking section, a rapid acceleration section, a steering section, a bump section, and/or a stop state as the precision diagnosis section. Also, in the case of a commercial vehicle, the controller 150 may set the road section within a predetermined distance on the basis of the garage, as the precision diagnosis section. In the case of a shared vehicle, the controller 150 may set a road section within a predetermined distance from a departure point without a passenger or a road section within a predetermined distance from an arrival point, as a precision diagnosis section. According to an embodiment, the controller 150 may set the precision diagnosis section based on Table 1.

TABLE 1

| Precision diagnosis section | Autonomous driving information |
|---|---|
| Stop state | Idle state sound information and speaker sound information |
| Straight fixed-speed section of 30 m | Driving sound information |
| Straight acceleration section of 50 m | Engine sound information and tire driving sound information |
| Straight deceleration section of 50 m | Engine sound information, tire driving sound information, and braking sound information |
| Rapid braking section of 10 m | Engine sound information, tire driving sound information, and braking sound information |
| Rapid acceleration section of to m | Engine sound information and tire driving sound information |
| Left/right rotation section | Steering sound information and braking sound information |
| U-turn section (maximum steering section) | Steering sound information and braking sound information |
| Bump section | Suspension sound information and vehicle body sound information |

The controller 150 determines whether two or more precision diagnosis sections are included in the autonomous driving section. When it is determined that two or more precision diagnosis sections are included, according to an embodiment, the controller 150 may calculate a priority by assigning a weight to each precision diagnosis section. For example, when the precision diagnosis sections of A, B, and C are included in the autonomous driving section, the controller 150 may assign the weight of the external noise effect and traffic information effect to each precision diagnosis section. According to an embodiment, the controller 150 may calculate the priority as shown in Table 2 based on the weight.

TABLE 2

|  |  | Precision diagnosis section A | Precision diagnosis section B | Precision diagnosis section C |
|---|---|---|---|---|
| Weight | External noise | 1 point | 2 points | 3 points |
|  | Traffic information | 2 points | 3 points | 1 points |
| Sum |  | 3 points | 5 points | 4 points |
| Priority |  | 3 | 1 | 2 |

The controller 150 may calculate the sum of weights of the external noise effect and the traffic information effect with respect to each precision diagnosis section A, B, or C, may calculate the priority in ascending order of the sum of weights, and may increase the reliability of the result determined in the precision diagnosis section as the priority is higher. That is, the controller 150 may determine that the reliability of the failure determination result is high in the precision diagnosis section 'B' having high priority. Accordingly, after the autonomous driving is currently completed, when autonomous driving is performed again, the controller 150 may determine that the failure determination result in the precision diagnosis section 'B' is reliable, when the precision diagnosis section 'B' is included in the autonomous driving section.

According to another embodiment, the controller 150 may determine whether two or more precision diagnosis sections are included in the autonomous driving section. When it is determined that two or more precision diagnosis sections are included, the controller 150 may calculate the priority in ascending order of a frequency, based on the frequency with which a vehicle is repeatedly driving in the precision diagnosis section. When the frequencies with which a vehicle is repeatedly driving are the same as one another with respect to each of the precision diagnosis sections, the controller 150 may assign a higher priority to a section having less external noise. As the priority is higher, the controller 150 may increase the reliability of the precision diagnosis section and may determine that the reliability of the failure determination result is high in a section having the high priority.

In the case of a commercial vehicle, the controller 150 may determine whether the commercial vehicle fails, based on the autonomous driving information obtained while the commercial vehicle is driving in the autonomous driving section. According to another embodiment, in the case of a commercial vehicle, the controller 150 may determine whether the commercial vehicle fails, based on the autonomous driving information obtained while the commercial vehicle is driving in the precision diagnosis section. Herein, in the case of a commercial vehicle, the controller 150 may set a road section within a predetermined distance on the basis of a garage, as the precision diagnosis section. According to an embodiment, the controller 150 may obtain information, which is obtained while a commercial vehicle is driving in a precision diagnosis section, and autonomous driving information obtained when the commercial vehicle is driving in the autonomous driving section at a point in time when the commercial vehicle leaves from the garage at the start of business and returns to the garage at the end of business. Herein, the driving information in a precision diagnosis section at the start of business and at the end of business is obtained. The reason is that the vehicle failure may be determined relatively accurately because it is expected that there will be less road noise due to little traffic and road noise around the garage, and thus there is less noise in determining whether a vehicle fails.

The controller 150 may compare the determination criterion with the autonomous driving information obtained while a commercial vehicle is driving in the autonomous driving section at a point in time when the commercial vehicle leaves from a garage at the start of business, and then may generate the primary determination result for determining whether the failure occurs. According to another embodiment, the controller 150 may compare the determination criterion with the autonomous driving information obtained while the commercial vehicle is driving in the precision diagnosis section at a point in time when the commercial vehicle leaves from a garage at the start of business, and then may generate the primary determination result for determining whether the failure occurs.

Furthermore, the controller 150 may compare the determination criterion with the autonomous driving information obtained while the commercial vehicle is driving in the autonomous driving section at a point in time when the commercial vehicle returns to the garage at the end of business, and then may generate the secondary determination result for determining whether the failure occurs. According to another embodiment, the controller 150 may compare the determination criterion with the autonomous driving information obtained while the commercial vehicle is driving in the precision diagnosis section at a point in time when the commercial vehicle returns to the garage at the end of business, and then may generate the secondary determination result for determining whether the failure occurs.

In addition, the controller 150 may compare the autonomous driving information, which is obtained when the commercial vehicle is driving in the autonomous driving section at the start of business, with the autonomous driving information obtained while the commercial vehicle is driving in the autonomous driving section at a point in time when the commercial vehicle returns to the garage at the end of business and then may generate the tertiary result of determining whether the failure occurs. According to another embodiment, the controller 150 may compare the autonomous driving information, which is obtained when the commercial vehicle is driving in the precision diagnosis section at the start of business, with the autonomous driving information obtained while the commercial vehicle is driving in the precision diagnosis section at a point in time when the commercial vehicle returns to the garage at the end of business and then may generate the tertiary determination result of determining whether the failure occurs.

The controller 150 may determine whether the commercial vehicle finally fails, based on the result of determining whether the primary failure occurs, the result of determining whether the secondary failure occurs, and the result of determining whether the tertiary failure occurs.

When the controller 150 determines that a commercial vehicle fails, the controller 150 may output a warning message for restricting the driving of the commercial vehicle and checking the commercial vehicle. When it is not determined that a commercial vehicle fails, the controller 150 may determine that the commercial vehicle is capable of normally driving.

Figure 2:
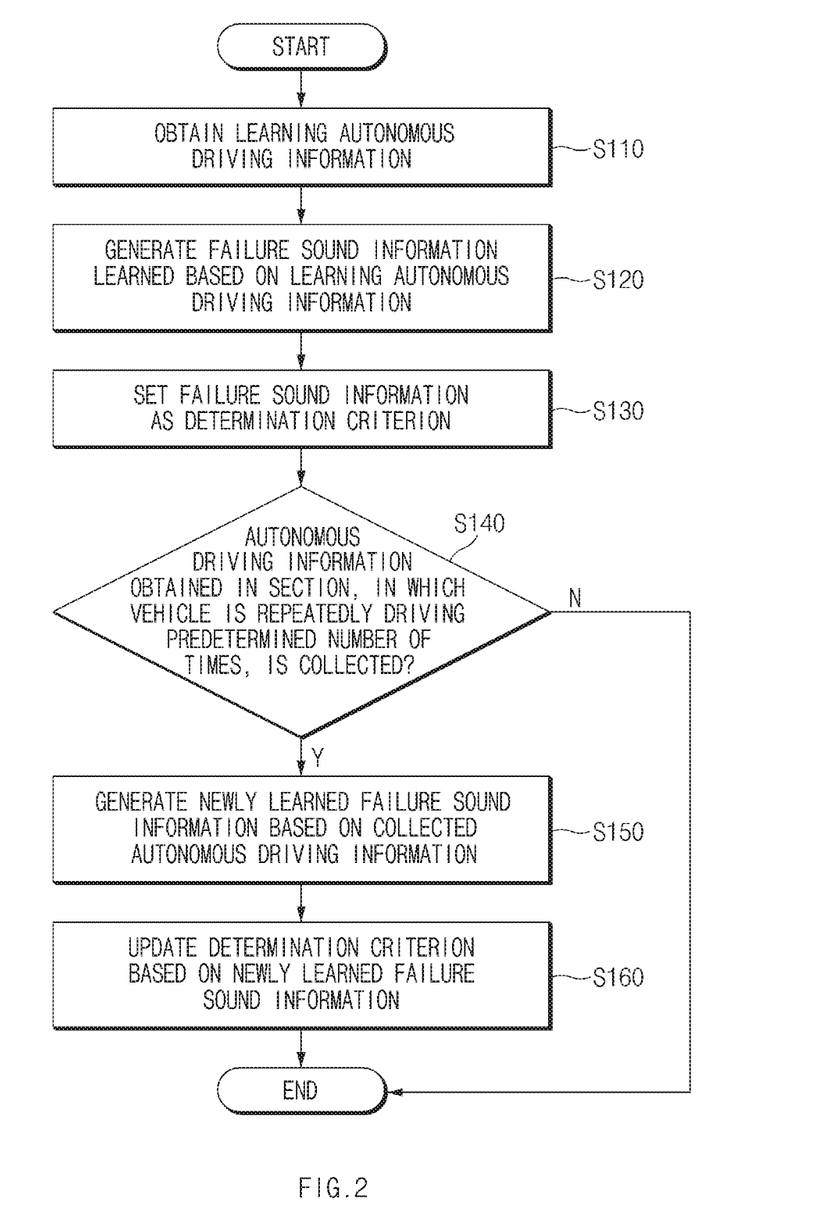
FIG. 2 is a flowchart illustrating a method of obtaining a determination criterion, according to an embodiment of the present disclosure.

FIG. 2 is a flowchart illustrating a method of obtaining a determination criterion, according to an embodiment of the present disclosure.

As shown in FIG. 2, the controller 150 may obtain learning autonomous driving information (S110). In S110, the controller 150 may obtain and collect sound information of a powertrain determined as failing, as the learning autonomous driving information.

The controller 150 may generate failure sound information learned based on the learning autonomous driving information (S120). In S120, the controller 150 may classify the collected driving information depending on characteristics, may convert (extract a specific vector) the classified driving information into a form easy for learning and may perform learning through deep learning based on the converted result. According to another embodiment, in S120, the controller 150 may transmit the learning autonomous driving information obtained in Silo to a server and may receive the learned failure sound information from a server. The controller 150 may set the failure sound information as the determination criterion (S130).

After the controller 150 sets the failure sound information to the determination criterion, the controller 150 determines whether the autonomous driving information obtained in the section, in which a vehicle is repeatedly driving the predetermined number of times, is collected (S140). In S140, when the controller 150 determines that the autonomous driving information obtained in the section, in which a vehicle is repeatedly driving the predetermined number of times, is collected (Y), the controller 150 may generate the failure sound information newly learned based on the collected autonomous driving information (S150). According to another embodiment, in S150, the controller 150 may transmit the autonomous driving information collected in S140 to a server and may receive the newly learned failure sound information from the server.

Furthermore, the controller 150 may update the determination criterion based on the newly learned failure sound information (S160).

Figure 3:
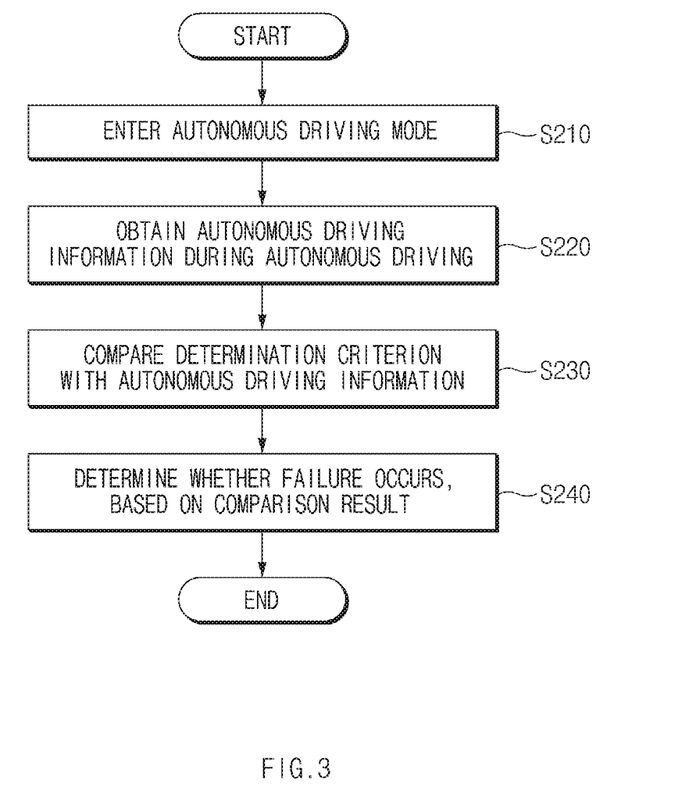
FIG. 3 is a flowchart illustrating a vehicle failure determining method, according to an embodiment of the present disclosure.

FIG. 3 is a flowchart illustrating a vehicle failure determining method, according to an embodiment of the present disclosure.

As illustrated in FIG. 3, the controller 150 controls a vehicle to enter an autonomous driving mode (S210). The controller 150 obtains autonomous driving information during autonomous driving (S220). The controller 150 compares the determination criterion set as failure sound information with the autonomous driving information obtained in S220 (S230). Herein, the determination criterion may include the determination criterion set in S130 of FIG. 2 and may include the determination criterion updated in S160 of FIG. 2.

The controller 150 may determine whether failure occurs, based on the comparison result of S230 (S240).

Figure 4:
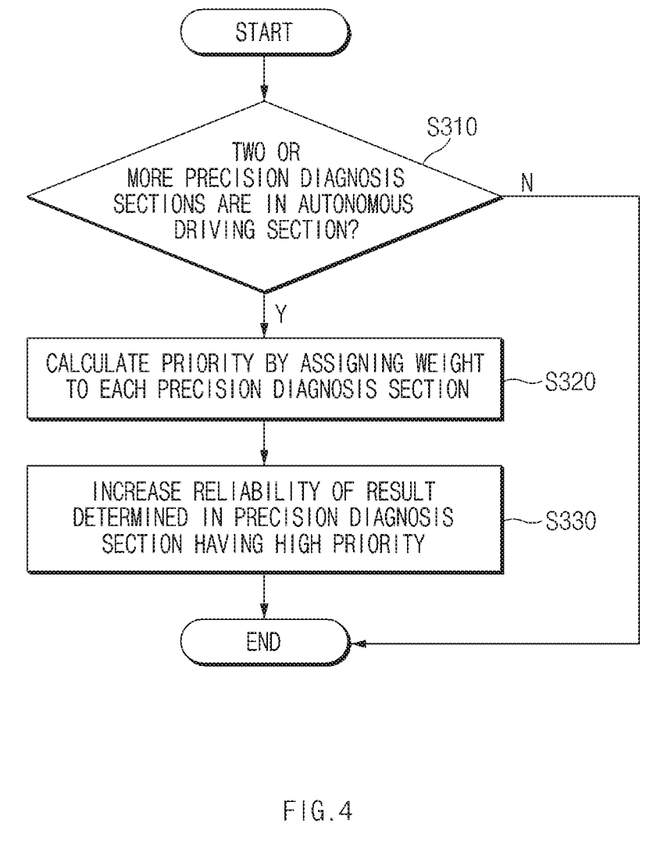
FIG. 4 is a flowchart illustrating a reliability setting method of a failure determination result, according to an embodiment of the present disclosure.

FIG. 4 is a flowchart illustrating a reliability setting method of a failure determination result, according to an embodiment of the present disclosure.

As illustrated in FIG. 4, the controller 150 determines whether two or more precision diagnosis sections are included in the autonomous driving section (S310). When the controller 150 determines that two or more precision diagnosis sections are included in the autonomous driving section (Y), the controller 150 may calculate a priority by assigning a weight to each precision diagnosis section (S320). Herein, according to an embodiment, the controller 150 may set at least one of a straight fixed-speed section, a straight deceleration section, a straight acceleration section, a rapid braking section, a rapid acceleration section, a steering section, a bump section, and/or a stop state as the precision diagnosis section.

In S320, the controller 150 may assign the weight of the external noise effect and traffic information effect to each precision diagnosis section, may calculate the sum of weights of the external noise effect and the traffic information effect with respect to each precision diagnosis section, and may calculate the priority in ascending order of the sum of weights.

The controller 150 increases the reliability of the result of determining whether failure occurs in the precision diagnosis section having a high priority (S330). In S330, as the priority of the precision diagnosis section is higher, the controller 150 may determine that the failure determination result is more reliable.

Figure 5:
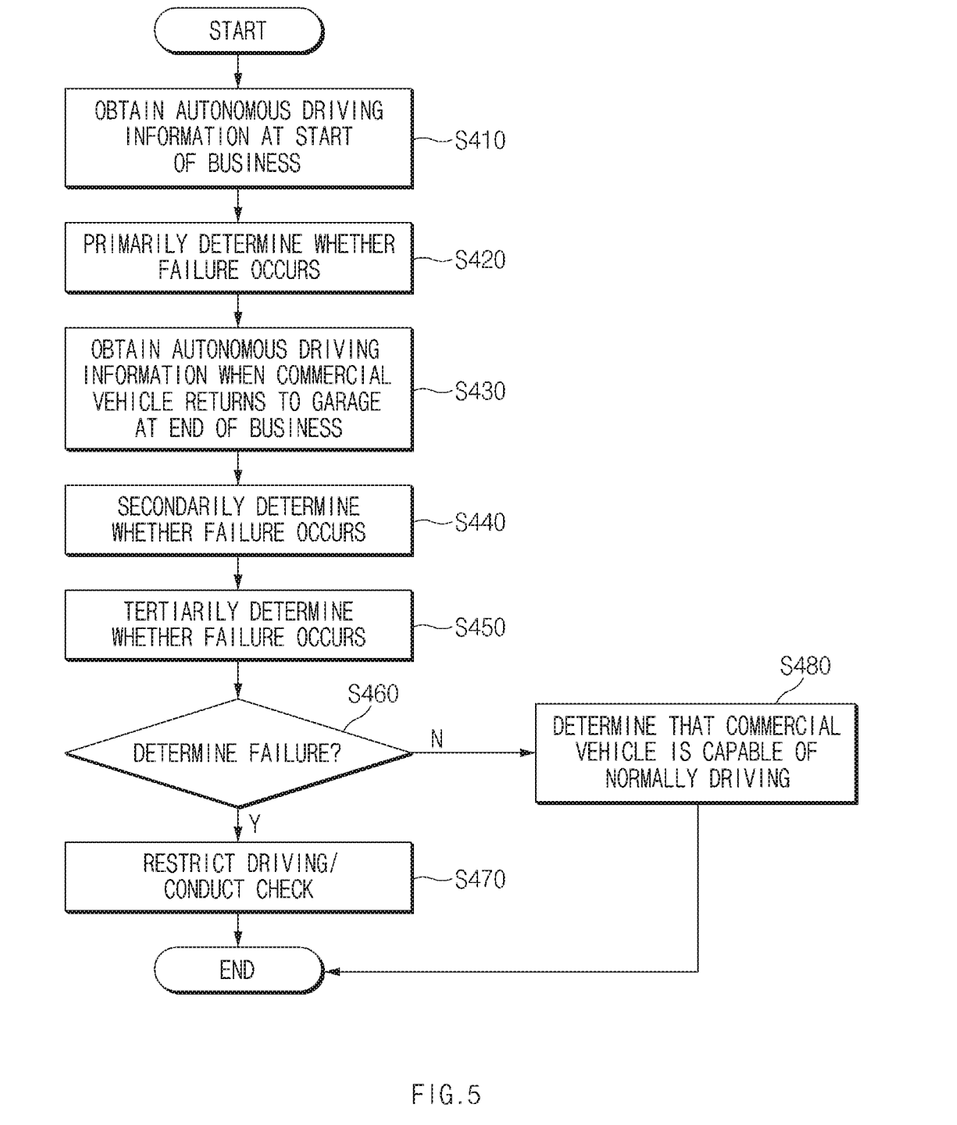
FIG. 5 is a flowchart illustrating a failure determining method of a commercial vehicle, according to an exemplary embodiment of the present disclosure.

FIG. 5 is a flowchart illustrating a failure determining method of a commercial vehicle, according to an exemplary embodiment of the present disclosure.

The controller 150 may obtain autonomous driving information of the first vehicle leaving from a garage to determine the failure of the commercial vehicle (S410). In S410, the autonomous driving information may include autonomous driving information obtained while a vehicle is driving in an autonomous driving section and autonomous driving information obtained while the vehicle is driving in a precision diagnosis section. Herein, the precision diagnosis section may include a road section within a predetermined distance based on the garage. In addition, the controller 150 may compare a determination criterion with the autonomous driving information obtained when the commercial vehicle leaves from a garage at the start of business and may generate a primary determination result of determining whether failure occurs, based on the comparison result (S420).

Furthermore, the controller 150 may obtain the autonomous driving information when the commercial vehicle returns to the garage at the end of business (S430). In S430, the autonomous driving information may include autonomous driving information obtained while a commercial vehicle is driving in an autonomous driving section and autonomous driving information obtained while the commercial vehicle is driving in a precision diagnosis section. In addition, the controller 150 may compare the determination criterion with the autonomous driving information obtained when the commercial vehicle returns to a garage at the end of business and then may generate a secondary determination result of determining whether failure occurs, based on the comparison result (S440). In S41o and S430, the autonomous driving information in a precision diagnosis section at the start of business and at the end of business is obtained. The reason is that the vehicle failure may be determined relatively accurately because it is expected that there will be less road noise due to little traffic and road noise around the garage, and thus there is less noise in determining whether a vehicle fails.

In addition, the controller 150 may compare the autonomous driving information obtained when the commercial vehicle leaves from a garage at the start of business with the autonomous driving information obtained when the commercial vehicle returns to the garage at the end of business and then may generate the tertiary determination result of determining whether the failure occurs, based on the comparison result (S450).

The controller 150 may determine whether the failure occurs, based on the result of determining whether the primary failure occurs, the result of determining whether the secondary failure occurs, and the result of determining whether the tertiary failure occurs (S460).

In S460, when the controller 150 determines that the commercial vehicle fails (Y), the controller 150 may output a warning message for restricting the driving of the commercial vehicle and checking the commercial vehicle (S470). When it is not determined that the commercial vehicle fails in S460 (N), the controller 150 may determine that a commercial vehicle is capable of normally driving (S480).

Figure 6:
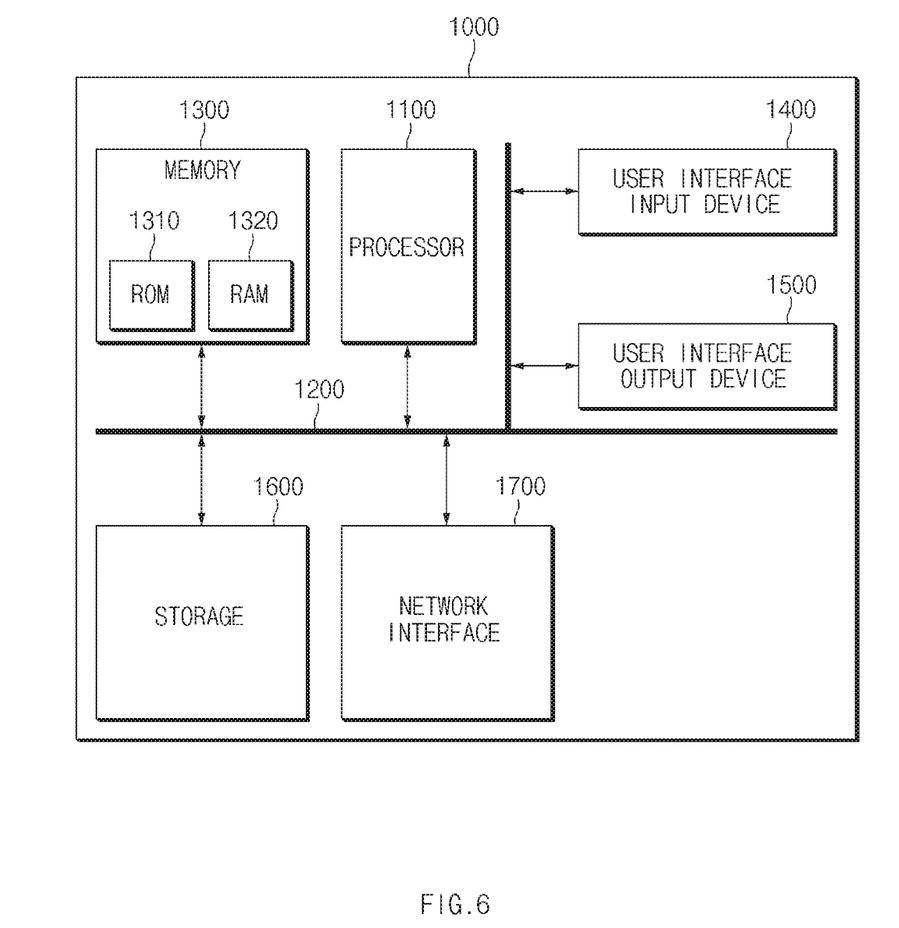
FIG. 6 is a block diagram illustrating a configuration of a computing system performing a method, according to an embodiment of the present disclosure.

FIG. 6 is a block diagram illustrating a configuration of a computing system performing a method, according to an embodiment of the present disclosure.

Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

A vehicle failure determining apparatus and method according to an embodiment of the present disclosure may compare the autonomous driving information obtained during autonomous driving with a determination criterion set as failure sound information. When the precision diagnosis section is included in the autonomous driving section, the vehicle failure determining apparatus may accurately determine the failure of a vehicle by improving the reliability of the result determined in the precision diagnosis section.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for determining failure of a vehicle, the apparatus comprising:
   a sensor configured to obtain autonomous driving information; and
   a controller configured to compare the autonomous driving information obtained during autonomous driving with a determination criterion set as failure sound information and to determine whether the failure occurs based on the comparison result,
   wherein the controller is configured to calculate a priority by respectively assigning weights to two or more precision diagnosis sections, when the two or more precision diagnosis sections are included in an autonomous driving section;
   wherein the autonomous driving section includes a road section performing autonomous driving of the vehicle;
   wherein the controller is configured to increase reliability of a result determined based on autonomous driving information obtained in precision diagnosis section having high priority;
   wherein the controller is configured to set at least one of a straight fixed-speed section, a straight deceleration section, a straight acceleration section, a rapid braking section, a rapid acceleration section, a steering section, a bump section, or a stop state as the precision diagnosis section;
   wherein the controller is configured to output a warning message for restricting the driving of vehicle and checking the vehicle when the controller determines that the vehicle fails; and
   wherein the controller is configured to determine that the vehicle is capable of normally driving when the controller does not determine that the vehicle fails.

2. The apparatus of claim 1, wherein the controller is configured to collect learning autonomous driving information and perform learning based on the collected learning autonomous driving information to generate the failure sound information.

3. The apparatus of claim 2, wherein the controller is configured to transmit the learning autonomous driving information to a server and receive learned failure sound information from the server.

4. The apparatus of claim 1, wherein the controller is configured to generate new failure sound information by performing learning based on collected autonomous driving information, when the autonomous driving information obtained in a section, in which the vehicle is repeatedly driving a predetermined number of times, is collected after the failure sound information is set as the determination criterion.

5. The apparatus of claim 4, wherein the controller is configured to transmit the collected autonomous driving information to a server and receive newly learned failure sound information from the server, when the autonomous driving information obtained in the section, in which the vehicle is repeatedly driving the predetermined number of times, is collected.

6. The apparatus of claim 5, wherein the controller is configured to update the determination criterion based on the newly learned failure sound information.

7. The apparatus of claim 1, wherein the controller is configured to set the precision diagnosis sections based on road information and traffic information.

8. The apparatus of claim 1, wherein the controller is configured to set a road section within a predetermined distance based on a garage as the precision diagnosis section in a case of a commercial vehicle.

9. The apparatus of claim 8, wherein the controller is configured to compare the determination criterion with autonomous driving information obtained while the commercial vehicle is driving in the precision diagnosis section at a point in time when the commercial vehicle leaves from the garage at a start of business and generate a primary determination result for determining whether the failure occurs in the case of the commercial vehicle.

10. The apparatus of claim 9, wherein the controller is configured to compare the determination criterion with autonomous driving information obtained while the commercial vehicle is driving in the precision diagnosis section at a point in time when the commercial vehicle returns to the garage at an end of business and generate a secondary determination result for determining whether the failure occurs in the case of the commercial vehicle.

11. The apparatus of claim 10, wherein the controller is configured to compare the autonomous driving information obtained while the commercial vehicle is driving in the precision diagnosis section at the point in time when the commercial vehicle leaves from the garage at the start of business with the autonomous driving information obtained while the commercial vehicle is driving in the precision diagnosis section at the point in time when the commercial vehicle returns to the garage at the end of business, and generate a tertiary determination result of determining whether the failure occurs, based on the comparison result, in the case of the commercial vehicle.

12. The apparatus of claim 11, wherein the controller is configured to determine whether the commercial vehicle fails based on the primary determination result, the secondary determination result, and the tertiary determination result.

13. The apparatus of claim 8, wherein the controller is configured to compare the determination criterion with autonomous driving information obtained while the commercial vehicle is driving in an autonomous driving section at a point in time when the commercial vehicle leaves from the garage at a start of business and generate a primary determination result for determining whether the failure occurs, in the case of the commercial vehicle.

14. The apparatus of claim 13, wherein the controller is configured to compare the determination criterion with autonomous driving information obtained while the commercial vehicle is driving in the autonomous driving section at a point in time when the commercial vehicle returns to the garage at an end of business and generate a secondary determination result for determining whether the failure occurs in the case of the commercial vehicle.

15. The apparatus of claim 14, wherein the controller is configured to compare the autonomous driving information obtained while the commercial vehicle is driving in the autonomous driving section at the point in time when the commercial vehicle leaves from the garage at the start of business with the autonomous driving information obtained while the commercial vehicle is driving in the autonomous driving section at the point in time when the commercial vehicle returns to the garage at the end of business, and generate a tertiary determination result of determining whether the failure occurs, based on the comparison result, in the case of the commercial vehicle.

16. The apparatus of claim 15, wherein the controller is configured to determine whether the commercial vehicle fails based on the primary determination result, the secondary determination result, and the tertiary determination result.

17. A method for operating a vehicle, the method comprising:
  obtaining, by a controller, autonomous driving information during autonomous driving;
  comparing, by the controller, the autonomous driving information with a determination criterion set as failure sound information;
  determining, by the controller, whether the failure occurs based on the comparison result;
  wherein the controller is configured to calculate a priority by respectively assigning weights to two or more precision diagnosis sections, when the two or more precision diagnosis sections are included in the autonomous driving section;
  wherein the autonomous driving section include road section performing autonomous driving of the vehicle;
  wherein the controller is configured to increase reliability of a result determined based on autonomous driving information obtained in precision diagnosis section having high priority;
  wherein the controller is configured to set at least one of a straight fixed-speed section, a straight deceleration section, a straight acceleration section, a rapid braking section, a rapid acceleration section, a steering section, a bump section, or a stop state as the precision diagnosis section;
  wherein the controller is configured to output a warning message for restricting the driving of vehicle and checking the vehicle, when the controller determines that the vehicle fails; and
  wherein the controller is configured to determine that the vehicle is capable of normally driving, when the controller does not determine that the vehicle fails.

* * * * *